(12) United States Patent
Tsai (10) Patent No.: US 12,218,535 B2
(45) Date of Patent: Feb. 4, 2025

(54) CHARGING AND DISCHARGING CIRCUIT

(71) Applicant: PEGATRON CORPORATION, Taipei (TW)

(72) Inventor: Hao-Hsiu Tsai, Taipei (TW)

(73) Assignee: PEGATRON CORPORATION, Taipei (TW)

(*) Notice: Subject to any disclaimer, the term of this patent is extended or adjusted under 35 U.S.C. 154(b) by 0 days.

(21) Appl. No.: 17/676,613

(22) Filed: Feb. 21, 2022

(65) Prior Publication Data

US 2022/0285963 A1 Sep. 8, 2022

(30) Foreign Application Priority Data

Mar. 3, 2021 (TW) .................................. 110107512

(51) Int. Cl.
*H02J 7/00* (2006.01)

(52) U.S. Cl.
CPC ...... *H02J 7/00304* (2020.01); *H02J 7/00041* (2020.01); *H02J 7/0013* (2013.01); *H02J 7/0068* (2013.01)

(58) Field of Classification Search
CPC .. H02J 7/00304; H02J 7/00041; H02J 7/0013; H02J 7/0068
See application file for complete search history.

(56) References Cited

U.S. PATENT DOCUMENTS

| | | | | |
|---|---|---|---|---|
| 10,326,287 B2* | 6/2019 | Hoyt | ..................... | H02J 7/0024 |
| 2016/0226266 A1* | 8/2016 | Huang | ................... | H02J 7/0068 |
| 2020/0052495 A1* | 2/2020 | Chen | ...................... | G06F 1/263 |
| 2020/0091740 A1* | 3/2020 | Isaacs | ................... | H02J 7/0049 |
| 2021/0036533 A1* | 2/2021 | Sporck | ................. | H02J 7/0071 |

FOREIGN PATENT DOCUMENTS

| | | | |
|---|---|---|---|
| CN | 103095126 | A | 5/2013 |
| CN | 111301194 | A | 6/2020 |
| TW | 200740115 | A | 10/2007 |
| TW | 201308296 | A1 | 2/2013 |
| TW | 201318325 | A1 | 5/2013 |
| TW | M500392 | U | 5/2015 |
| TW | 201939299 | A | 10/2019 |
| TW | 202005225 | A | 1/2020 |
| WO | WO 2019177810 | A1 | 9/2019 |

* cited by examiner

*Primary Examiner* — Lincoln D Donovan
*Assistant Examiner* — James G Yeaman
(74) *Attorney, Agent, or Firm* — Li & Cai Intellectual Property (USA) Office (57) ABSTRACT

A charging and discharging circuit is provided, which includes a charging and discharging control circuit, a first connection port, a first switch circuit, a second switch circuit, a second connection port, a third switch circuit, a fourth switch circuit, and an identification logic circuit. The identification logic circuit determines a mode of the first connection port according to a first channel configuration signal of the first connection port, the charging and discharging control circuit switches the first switch circuit and the second switch circuit according to the mode of the first connection port, and the charging and discharging control circuit determines a mode of the second connection port according to a second channel configuration signal of the second connection port, so as to switch the third switch circuit and the fourth switch circuit.

12 Claims, 5 Drawing Sheets

CHARGING AND DISCHARGING CIRCUIT

CROSS-REFERENCE TO RELATED PATENT APPLICATION

This application claims the benefit of priority to Taiwan Patent Application No. 110107512, filed on Mar. 3, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a charging and discharging circuit, and more particularly to a charging and discharging circuit that can allow dual USB ports to charge and/or discharge independently in one mobile electronic device.

BACKGROUND OF THE DISCLOSURE

In the existing charging and discharging circuit, if two or more universal serial bus (USB) ports are simultaneously supplying power to a system of a mobile electronic device, a voltage difference between the USB ports causes the reverse voltage with each other, thereby damaging part of adapters in the USB ports.

On the other hand, if one of the USB ports needs to charge the system of the mobile electronic device, and the system outputs signals through the other USB port in USB On-The-Go (OTG) standard, then the USB port that is inserted at a later time will fail to work properly. For example, a USB port will not be able to perform charging if the USB port for charging is plugged in later, and the USB for OTG output will not be able to perform OTG outputting if the USB port for OTG output is plugged in later.

SUMMARY OF THE DISCLOSURE

In response to the above-referenced technical inadequacies, the present disclosure provides a charging and discharging circuit that can allow dual USB ports to charge and/or discharge independently in a mobile electronic device.

In one aspect, the present disclosure provides a charging and discharging circuit that connects the battery module and the system-side circuit. The charging and discharging circuit includes a charging and discharging control circuit, a first connection port, a first switch circuit, a second switch circuit, a second connection port, a third switch circuit, a fourth switch circuit and an identification logic circuit. The charging and discharging control circuit has a first input terminal, a second input terminal, an identification terminal, a battery terminal and an output terminal. The battery terminal is connected to the battery module, and the output terminal is connected to the system-side circuit. The first switch circuit is connected between the first connection port and the first input terminal to form a first charging path. The second switch circuit is connected between the first connection port and the output terminal to form a first discharging path. The third switch circuit is connected between the second connection port and the second input terminal to form a second charging path. The fourth switch circuit is connected between the second connection port and the output terminal to form a second discharging path. The identification logic circuit is connected to the first connection port and configured to determine whether a mode of the first connection port mode is in a first charging mode or a first discharging mode according to a first channel configuration signal of the first connection port in response to the first port being connected to a first signal source. The charging and discharging control circuit is configured to control the first switch circuit to be switched in the first charging mode to enable the first charging path, or to control the second switch circuit to be switched in the first discharging mode to enable the first discharging path. The charging and discharging control circuit is configured to receive a second channel configuration signal from the second connection port through the identification terminal in response to the second connection port being connected to a second signal source, so as to determine whether a mode of the second connection port is in a second charging mode or a second discharging mode, and the charging and discharging control circuit is configured to control the third switch circuit to be switched in the second charging mode to enable the second charging path, or to control the fourth switch circuit to be switched in the second discharging mode to enable the second discharging path.

Therefore, the charging and discharging circuit of the present disclosure provides an independent control mechanism and a charging/discharging path for each of the dual USB ports so as to realize that the dual USB ports in a mobile electronic device are configured to charge and discharge independently. When both of the dual USB ports are configured to enter a charging mode to charge a battery module of the mobile electronic device, the dual USB ports are controlled according to a predetermined priority to avoid reverse voltage with each other. In addition, the charging and discharging circuit of the present disclosure also can support that the dual USB ports enter into the discharging mode simultaneously.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
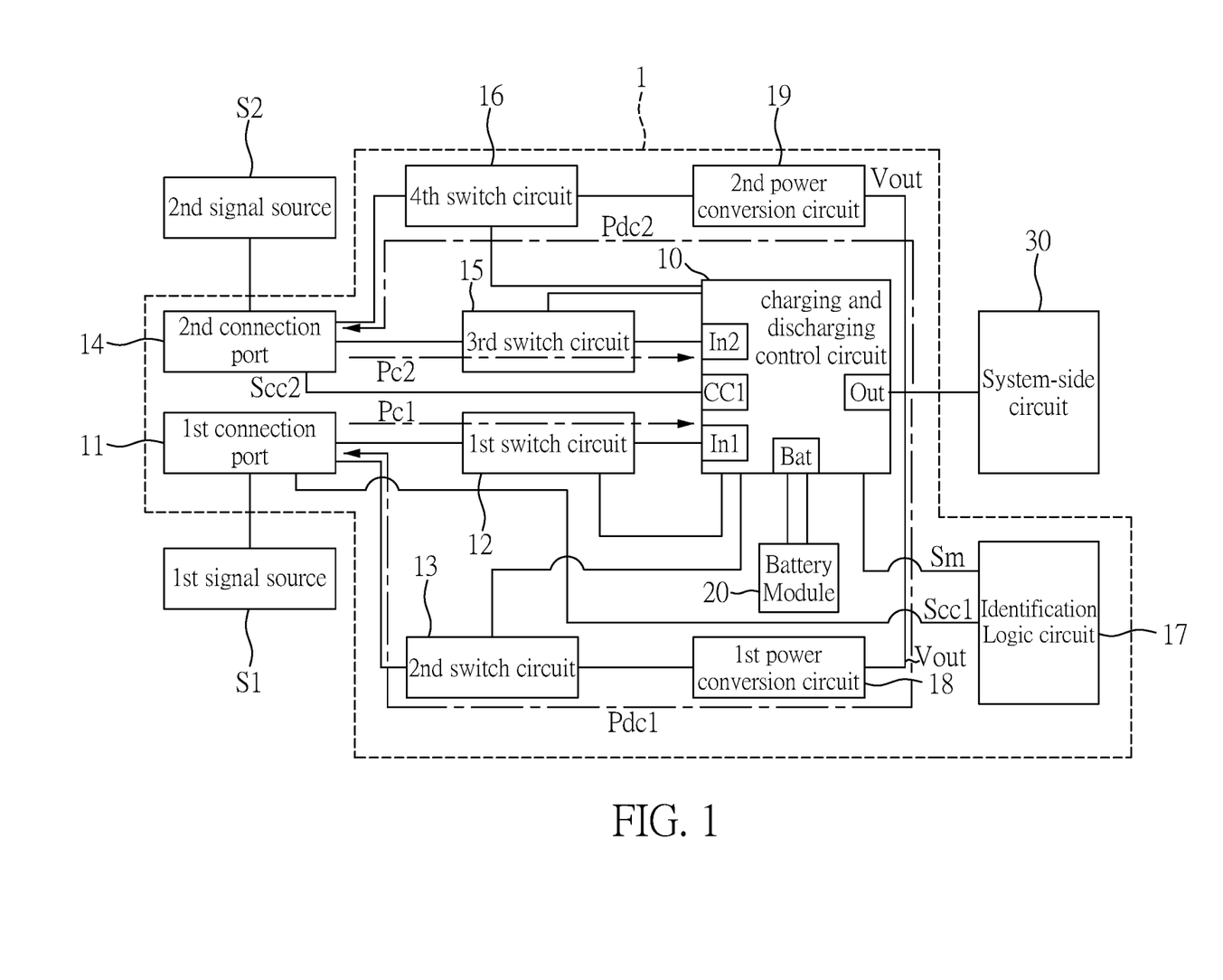
FIG. 1 is a circuit layout of a charging and discharging circuit according to one embodiment of the present disclosure.

FIG. 1 is a circuit layout of a charging and discharging circuit according to one embodiment of the present disclosure. Referring to FIG. 1, an embodiment of the present invention provides a charging and discharging circuit 1, which includes a charging and discharging control circuit 10, a first connection port 11, a first switch circuit 12, a second switch circuit 13, a second connection port 14, and a third switch circuit 15, the fourth switch circuit 16 and the identification logic circuit 17. In one embodiment, the first connection port 11 and the second connection port 14 can be the same type of connection port, such as a universal serial bus (USB) type-C connection port. The present disclosure is not limited thereto. In one embodiment, the first connection port 12 and the second connection port 22 can also be different types of connection ports, such as a USB Type-A connection port and a USB Type-C connection port.

The charging and discharging control circuit 10 has a first input terminal In1, a second input terminal In2, an identification terminal CC1, a battery terminal Bat, and an output terminal Out. The battery terminal Bat is connected to the battery module 20, and the output terminal Out is connected to a system-side circuit 30. For example, the charging and discharging control circuit 10, the battery module 20, and the system-side circuit 30 can be built in a mobile electronic device, the system-side circuit 30 can be powered by the battery module 20 through the charging and discharging control circuit 10, and the charging and discharging control circuit 10 can be connected to an external signal source, such as a voltage source, to charge the battery module 20 through the first connection port 11 and the second connection port 14, or can be connected to another electronic device that needs to be powered by the above-mentioned mobile electronic device.

For example, the charging and discharging control circuit 10 can be, for example, a programmable logic controller circuit, a micro-processor circuit, a digital signal processor (DSP), or a micro-control circuit, but the present disclosure is not limited thereto.

Next, the first switch circuit 12 is connected between the first connection port 11 and the first input terminal In1 to form a first charging path Pc1. The second switch circuit 13 is connected between the first connection port 11 and the output terminal Out to form a first discharge path Pdc1.

On the other hand, the third switch circuit 15 is connected between the second connection port 14 and the second input terminal In2 to form a second charging path Pc2. The fourth switch circuit 16 is connected between the second connection port 14 and the output terminal Out to form a second discharge path Pdc2.

For example, the first switch circuit 12, the second switch circuit 13, the third switch circuit 15 and the fourth switch circuit 16 each include a P-type metal-oxide-semiconductor field effect transistor (PMOSFET) and an N-type metal-oxide-semiconductor field effect transistor (NMOSFET). In certain embodiments, the first switch circuit 12, the second switch circuit 13, the third switch circuit 15 and the fourth switch circuit 16 further each include a current limiting unit, which is configured to turn off the corresponding PMOSFET and the corresponding NMOSFET in response to a rated current being exceeded. For example, the first switch circuit 12, the second switch circuit 13, the third switch circuit 15, and the fourth switch circuit 16 are all power switches to ensure the safety and reliability of power supplies. The current limiting unit can safely cut off the power supply in response to overloading or overheating. The power switch can include a control terminal (for example, an EN pin), which is used to activate the MOSFET and prevent reverse current through a diode. In response to an output current of the power switch exceeding a current upper limit threshold, the current limiting unit turns off the MOSFET. In certain embodiments, the power switch can include another terminal to notify the system that a failure has occurred in response to any protection function being triggered. In another embodiment, the charging and discharging control circuit 10 can also be provided with the current limiting unit for the first input terminal In1 and the second input terminal In2, such that in response to the rated current being exceeded, the corresponding first input terminal In1 or the second input terminal In2 can be disabled; however, the foregoing configuration is for exemplary purposes only, and the present disclosure is not limited thereto.

The identification logic circuit 17 is connected to the first connection port 11. The identification logic circuit 17 can be, for example, a programmable logic controller circuit, a micro-processor circuit, a digital signal processor (DSP), or a micro-control circuit, but the present disclosure is not limited thereto.

More specifically, the identification logic circuit 17 is connected to a channel configuration (CC) pin of the first connection port 11. When the first connection port 11 is connected to the first signal source S1, the identification logic circuit 17 can establish a corresponding power transmission mode with a first signal source S1 from an external device through the CC pin of the first connection port 11, for example: a master-slave relationship, which one serves as a master device (Host) to be used as a power supply end (Source), and which one serves as a slave device (Slave) to be used as a power receiving end (Sink), and a charging specification between the charging and discharging control circuit 10 and the first signal source S1, and the like.

In response to the first connection port 11 being connected to the first signal source S1, the identification logic circuit 17 determines whether a mode of the first connection port 11 is in a first charging mode or a first discharging mode according to a first channel configuration signal Scc1 of the first connection port 11, and outputs a mode signal Sm indicating the mode of the first connection port 11 to the charging and discharging control circuit 10, correspondingly.

In detail, in response to the identification logic circuit 17 determining that the first signal source S1 is a master device (Host), the charging and discharging control circuit 10 is a slave device (Slave), the identification logic circuit 17 determines that the mode of the first port 11 is in the first charging mode. In other words, the first charging path Pc1 is to be used, and the identification logic circuit 17 correspondingly generates the mode signal Sm to inform the charging and discharging control circuit 10 that the first charging path Pc1 needs to be enabled.

In contrast, in response to the identification logic circuit 17 determining that the first signal source S1 is the slave device and the charging and discharging control circuit 10 is the master device, the identification logic circuit 17 determines that the mode of the first connection port 11 is in the first discharging mode. In other words, the first discharging path Pdc1 is to be used, and the identification logic circuit 17 correspondingly generates the mode signal Sm to inform the charging and discharging control circuit 10 that the first discharging path Pdc1 needs to be enabled.

Further, in response to the charging and discharging control circuit 10 receiving the mode signal Sm, according to which of the first charging mode or the first discharging mode that the first connection port 11 is in as indicated by the mode signal Sm, the first switch circuit 12 is controlled to be switched in the first charging mode so as to enable the first charging path Pc1, or the second switch circuit 13 is controlled to be switched in the first discharging mode so as to enable the first discharging path Pdc1.

Similarly, the charging and discharging control circuit 10 is connected to the second connection port 14 and has a similar identification mechanism. In response to the second connection port 14 being connected to the second signal source S2, the charging and discharging control circuit 10 receives a second channel configuration signal Scc2 from the second connection port 14 through the identification terminal CC1, which is used to determine whether the mode of the second connection port 14 is in the second charging mode or the second discharging mode.

In detail, the identification logic circuit 17 is connected to a channel configuration (CC) pin of the second connection port 14. When the second connection port 14 is connected to the second signal source S2, the charging and discharging control circuit 17 can establish a corresponding power transmission mode with the second signal source S2 of an external device through the CC pin of the second connection port 14, for example: a master-slave relationship, which one serves as a master device (Host) to be used as a power supply end (Source), and which one serves as a slave device (Slave) to be used as a power receiving end (Sink), and a charging specification between the charging and discharging control circuit 10 and the second signal source S1, and the like.

In response to the second connection port 14 being connected to the second signal source S2, the charging and discharging control circuit 10 can determine a master-slave relationship between the second signal source S2 and the charging and discharging control circuit according to the second channel configuration signal Scc2, so as to determine whether the mode of the second connection port 14 is in the second charging mode or in the second discharging mode, whereby the charging and discharging control circuit 10 can control the third switch circuit 15 and the fourth switch circuit 16 to be switched, so as to enable the second charging path Pc2 or the second discharge path Pdc2.

For example, in response to the charging and discharging control circuit 10 determining that the second signal source S2 is the master device and the charging and discharging control circuit 10 is the slave device, the charge and discharge control circuit 10 determines that the mode of the second connection port 14 is in the second charging mode. In other words, the second charging path Pc2 is to be used.

In contrast, in response to the charging and discharging control circuit 10 determining that the second signal source S2 is the slave device and the charging and discharging control circuit 10 is the master device, the charging and discharging control circuit 10 determines that the mode of the second connection port 14 is in the second discharging mode. In other words, the second discharge path Pdc2 is to be used.

In addition, in the embodiment of FIG. 1, the charging and discharging circuit 1 further includes a first power conversion circuit 18 and a second power conversion circuit 19. The first power conversion circuit 18 is connected between the second switch circuit 13 and the output terminal Out, and the second power conversion circuit 19 is connected between the fourth switch circuit 16 and the output terminal Out. The first power conversion circuit 18 is configured to perform power conversion on an output voltage Vout at the output terminal Out in response to the first discharging path being enabled, and the second power conversion circuit 19 is configured to perform power conversion on the output voltage Vout in response to the second discharging path being enabled.

For example, the first power conversion circuit 18 and the second power conversion circuit 19 can be a boost power converter, a buck power converter, or a buck-boost power converter. The type of the power converters can be determined according to the output voltage provided by the charging and discharging control circuit 10 Vout, the rated voltage of the battery module 20, and voltages to be output to the first connection port 11 and the second connection port 14, so as to step up or step down the output voltage. The above are only examples, and the present disclosure is not limited thereto.

However, as described above, in order to avoid reverse voltage with each other, or where the USB port that is inserted later cannot operate properly, the charging and discharging circuit 1 provided by the present disclosure has different manners of control for different scenarios.

Figure 2:
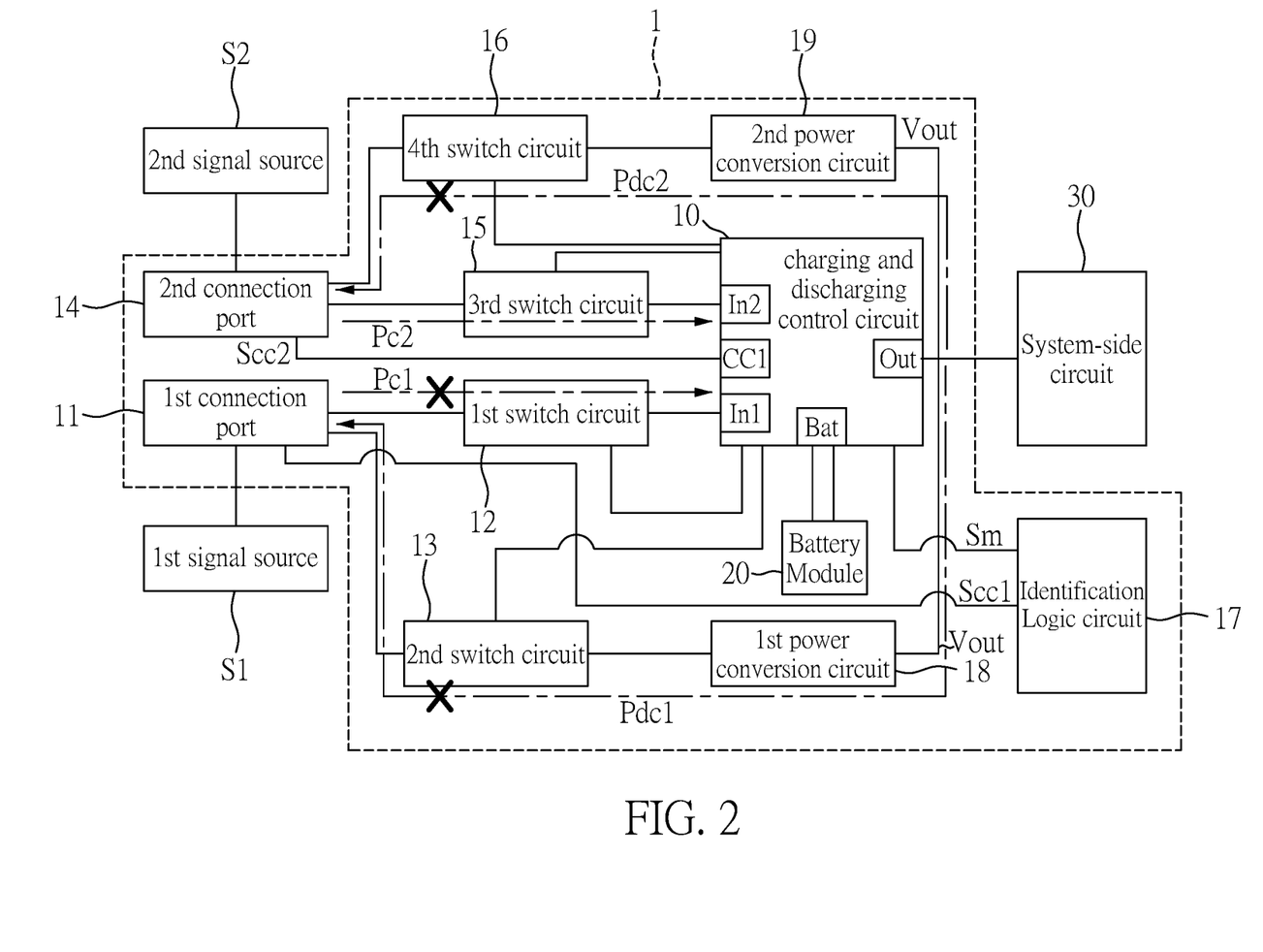
FIG. 2 is a schematic diagram of charging and discharging paths in a first charging and discharging scenario according to one embodiment of the present disclosure.

Reference can be made to FIG. 2, which is a schematic diagram of the charging and discharging paths in a first charging and discharging scenario according to one embodiment of the present disclosure. In the first charging and discharging scenario, the first signal source Si and the second signal source S2 can be, for example, adapters that can both provide electricity to the battery module 20. Therefore, the charging and discharging control circuit 10 determines that the mode of the second connection port 14 is in the second charging mode, and is informed, according to the mode signal Sm, that the first connection port 11 is determined by the identification circuit 17 to be in the first charging mode. The charging and discharging control circuit 10 is configured to, according to a predetermined priority set by the user, sequentially control the first switch circuit 12 and the third switch circuit 15, so as to enable one of the first charging path Pc1 and the second charging path Pc2, and disable the other.

In the embodiment of FIG. 2, the predetermined priority prioritizes use of the second connection port 14. Therefore, the charging and discharging control circuit 10 controls the first switch circuit 12 to be turned off, and the third switch circuit 15 to be turned on, so as to disable the first charging path Pc1 and enable the second charging path Pc2. At the same time, the charging and discharging control circuit 10 charges the battery module 20 through the battery terminal Bat in response to the second charging path Pc2 being enabled.

In addition, it should be noted that the first charging path Pc1 and the first discharging path Pdc1 are mutually exclusive, and when one is enabled, the other is disabled. Similarly, the second charging path Pc2 and the second discharging path Pdc2 are mutually exclusive. Therefore, in the first charging and discharging scenario, the charging and discharging control circuit 10 also controls the second switch circuit 13 and the fourth switch circuit 16 to be turned off, so as to disable the first discharging path Pdc1 and the second discharging path Pdc2.

Figure 3:
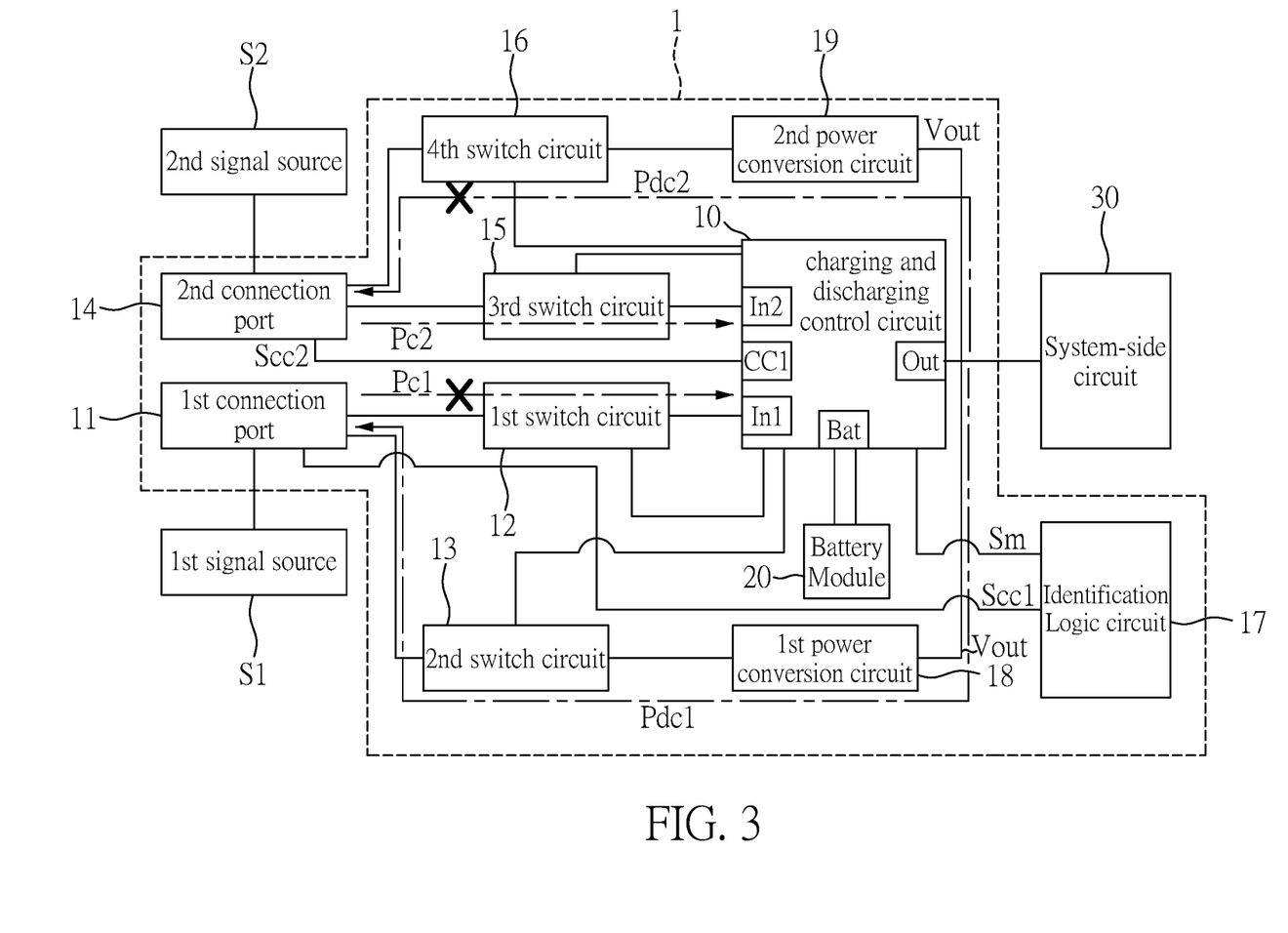
FIG. 3 is a schematic diagram of charging and discharging paths in a second charging and discharging scenario according to one embodiment of the present disclosure.

Reference can be made to FIG. 3, which is a schematic diagram of the charging and discharging paths in a second charging and discharging scenario according to one embodiment of the present disclosure. In the second charging and discharging scenario, the first signal source S1 is another electronic device that needs to be powered, and the second signal source S2 is an adapter that can provide electricity to the battery module 20. Therefore, the charging and discharging control circuit 10 determines that the mode of the second connection port 14 is in the second charging mode, and is informed, according to the mode signal Sm, that the first connection port 11 is determined to be in the first discharging mode by the identification circuit 17. The charging and discharging control circuit 10 controls the second switch circuit 12 and the third switch circuit 15 to be turned on, so as to enable the first discharging path Pdc1 and the second charging path Pc2. At the same time, the charging and discharging control circuit 10 charges the battery module 20 through the battery terminal Bat in response to the second charging path Pc2 being enabled. In addition, in the second charging and discharging scenario, the charging and discharging control circuit 10 also controls the first switch circuit 12 and the fourth switch circuit 16 to be turned off, so as to disable the first charging path Pdc1 and the second discharging path Pdc2.

Figure 4:
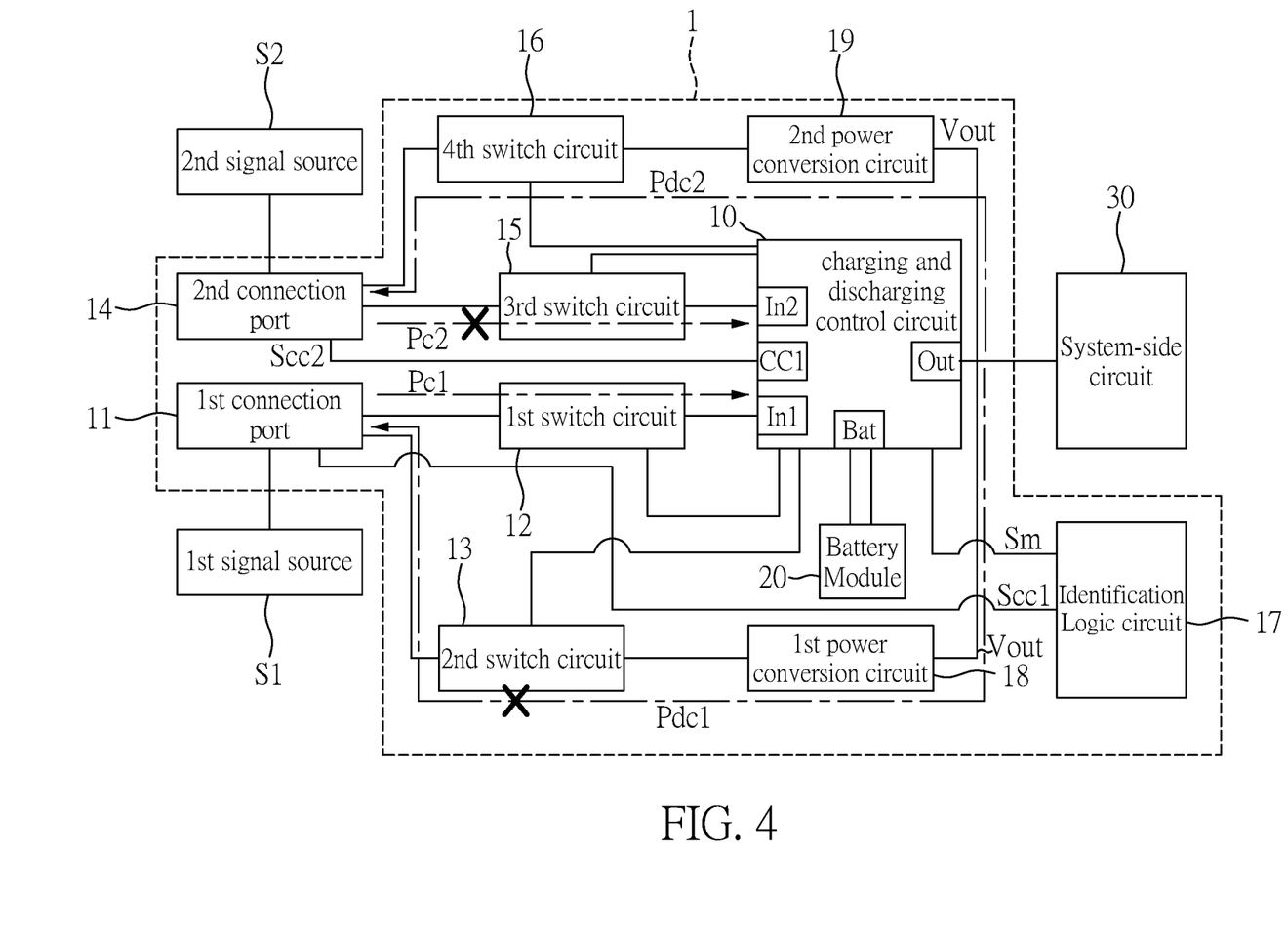
FIG. 4 is a schematic diagram of charging and discharging paths in a third charging and discharging scenario according to one embodiment of the present disclosure.

Reference can be made to FIG. 4, which is a schematic diagram of the charging and discharging paths in a third charging and discharging scenario according to one embodiment of the present disclosure. In the third charging and discharging scenario, the first signal source S1 is an adapter that can provide power to the battery module 20, and the second signal source S2 is another electronic device that needs to be powered. Therefore, the charging and discharging control circuit 10 determines the mode of the second connection port 14 is in the second discharging mode, and is informed, according to the mode signal Sm, that the first connection port 11 is determined to be in the first charging mode by the identification circuit 17. The charging and discharging control circuit 10 controls the first switch circuit 12 and the fourth switch circuit 16 to be turned on, so as to enable the first charging path Pc1 and the second discharging path Pdc2. At the same time, the charging and discharging control circuit 10 charges the battery module 20 through the battery terminal Bat when the first charging path Pc1 is enabled. In addition, in the third charging and discharging scenario, the charging and discharging control circuit 10 also controls the second switching circuit 13 and the third switching circuit 15 to be turned off, so as to disable the first discharging path Pdc1 and the second charging path Pc2.

Figure 5:
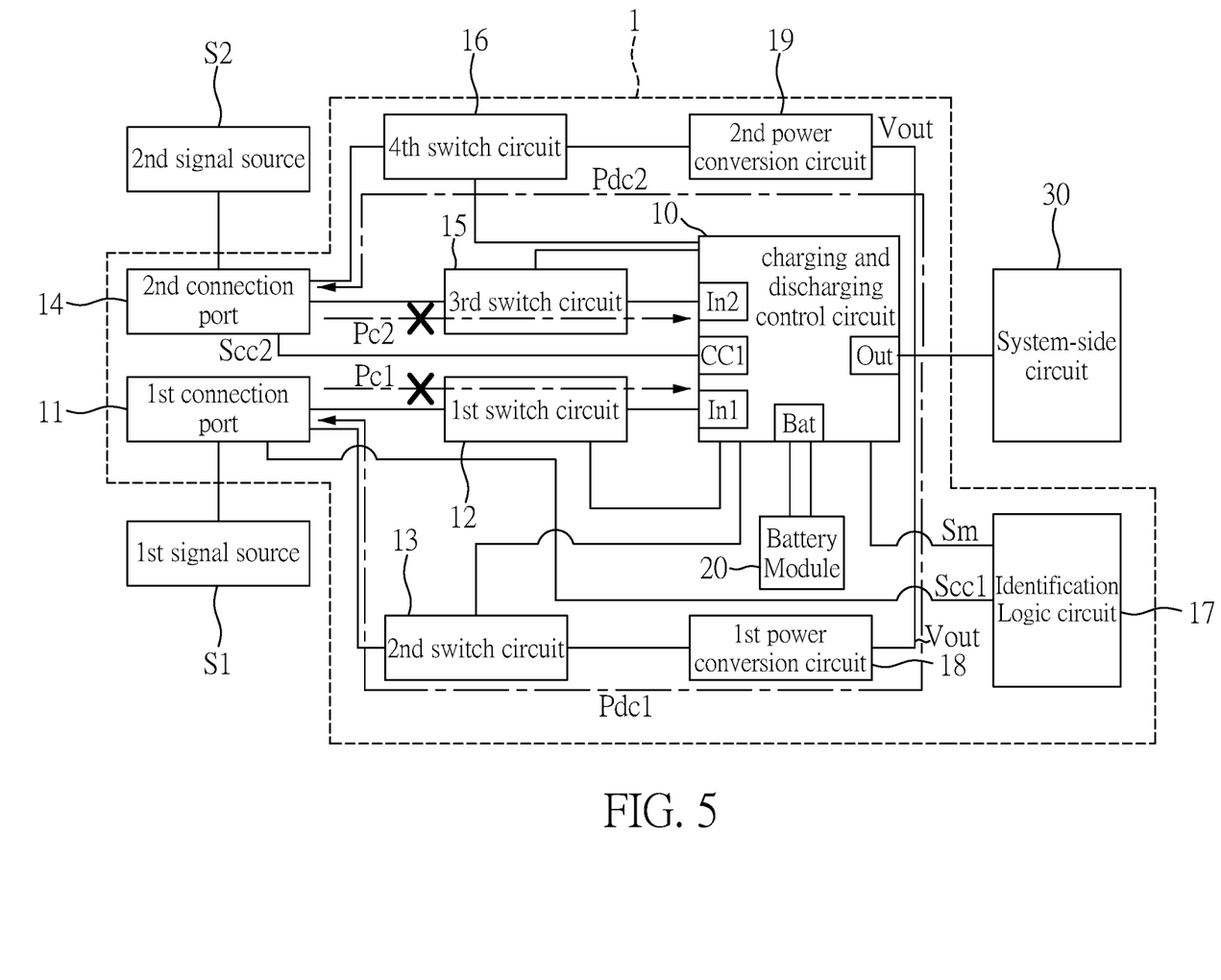
FIG. 5 is a schematic diagram of charging and discharging path in a fourth charging and discharging scenario according to one embodiment of the present disclosure.

FIG. 5 is a schematic diagram of charging and discharging path in a fourth charging and discharging scenario according to one embodiment of the present disclosure. In the fourth charging and discharging scenario, both the first signal source S1 and the second signal source S2 are electronic devices that need to be powered. Therefore, the charging and discharging control circuit 10 determines that the mode of the second connection port 14 is in the second discharging mode, and is informed, according to the mode signal Sm, that the first connection port 11 is determined to be in the first discharge mode by the identification circuit 17. The charging and discharging control circuit 10 controls the second switch circuit 13 and the fourth switch circuit 16 to be turned on, so as to enable the first discharging path Pdc1 and the second discharge path Pdc2. At the same time, in response to the first discharging path Pdc1 and the second discharging path Pdc2 both being enabled, the battery module 20 charges the first signal source S1 and the second signal source S2 through the battery terminal Bat. In addition, in the third charging and discharging scenario, the charging and discharging control circuit 10 also controls the first switching circuit 12 and the third switching circuit 15 to be turned off, so as to disable the first charging path Pc1 and the second charging path Pc2.

In conclusion, the charging and discharging circuit provided by the present disclosure can realize independent usage of each of the dual USB ports in a mobile electronic device, including both charging and discharging, by providing independent charging and discharging paths, and an independent control mechanism for the dual USB ports.

Furthermore, in the charging and discharging circuit provided by the present disclosure, when the dual USB ports are both configured to enter a charging mode, the dual USB ports are controlled according to a predetermined priority to avoid reverse voltage with each other and charge a battery module of the mobile electronic device. In addition, the charging and discharging circuit provided by the present disclosure supports simultaneous entering of the dual USB ports into the discharging mode.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A charging and discharging circuit, which is connected to a battery module and a system-side circuit, the charging and discharging circuit comprising:
   a charging and discharging control circuit having a first input terminal, a second input terminal, an identification terminal, a battery terminal and an output terminal, wherein the battery terminal is connected to the battery module, and the output terminal is connected to the system-side circuit;
a first connection port;
a first switch circuit connected between the first connection port and the first input terminal to form a first charging path;
a second switch circuit connected between the first connection port and the output terminal to form a first discharging path;
a second connection port;
a third switch circuit connected between the second connection port and the second input terminal to form a second charging path;
a fourth switch circuit connected between the second connection port and the output terminal to form a second discharging path; and
an identification logic circuit connected to the first connection port and configured to determine whether a mode of the first connection port is a first charging mode or a first discharging mode according to a first channel configuration signal of the first connection port in response to the first port being connected to a first signal source,
wherein the charging and discharging control circuit is configured to control the first switch circuit to be switched in the first charging mode to enable the first charging path, or to control the second switch circuit to be switched in the first discharging mode to enable the first discharging path; wherein the charging and discharging control circuit is configured to receive a second channel configuration signal from the second connection port through the identification terminal in response to the second connection port being connected to a second signal source, so as to determine whether a mode of the second connection port is in a second charging mode or a second discharging mode, and the charging and discharging control circuit is configured to control the third switch circuit to be switched in the second charging mode to enable the second charging path, or to control the fourth switch circuit to be switched in the second discharging mode to enable the second discharging path,
wherein, when the first connection port is in the first charging mode and the second connection port is in the second charging mode, the charging and discharging control circuit enables one of the first charging path and the second charging path and disable another one of the first charging path and the second charging path,
wherein, when one of the first charging path and the first discharging path is enable, another one of the first charging path and the first discharging path is disable, and when one of the second charging path and the second discharging path is enable, another one of the second charging path and the second discharging path is disable,
wherein the first charging path, the second charging path, the first discharging path and the second discharging path are independent with one another.

2. The charging and discharging circuit according to claim 1, wherein the identification logic circuit is configured to, in response to determining that the mode of the first connection port is the first charging mode or the first discharging mode, output a mode signal indicating the mode of the first connection port to the charging and discharging control circuit, correspondingly.

3. The charging and discharging circuit of claim 1, wherein, in response to the first connection port being determined to be in the first charging mode and the second connection port being determined to be in the second charging mode, the charging and discharging control circuit is configured to control the first switch circuit and the third switch circuit according to a predetermined priority, so as to enable one of the first charging path and the second charging path and disable another one of the first charging path and the second charging path.

4. The charging and discharging circuit according to claim 1, further comprising:
a first power conversion circuit connected between the second switch circuit and the output terminal; and
a second power conversion circuit connected between the fourth switch circuit and the output terminal,
wherein the first power conversion circuit is configured to convert an output voltage of the output terminal in response to the first discharging path being enabled, and the second power conversion circuit is configured to convert the output voltage in response to the second discharging path being enabled.

5. The charging and discharging circuit according to claim 1, wherein the identification logic circuit is further configured to determine a master-slave relationship between the first signal source and the charging and discharging control circuit according to the first channel configuration signal, so as to determine whether the mode of the first connection port is in the first charging mode or the first discharging mode.

6. The charging and discharging circuit according to claim 5, wherein, in response to the identification logic circuit determining that the first signal source is a master device and the charging and discharging control circuit is a slave device, the identification logic circuit determines that the mode of the first connection port is in the first charging mode, so as to generate the mode signal, correspondingly,
wherein, in response to the identification logic circuit determining that the first signal source is the slave device and the charging and discharging control circuit is the master device, the identification logic circuit determines that the mode of the first connection port is in the first discharging mode, so as to generate the mode signal, correspondingly.

7. The charging and discharging circuit according to claim 1, wherein the charging and discharging control circuit is further configured to determine a master-slave relationship between the second signal source and the charging and discharging control circuit according to the second channel configuration signal, so as to determine whether the mode of the second connection port is in the second charging mode or the second discharging mode.

8. The charging and discharging circuit according to claim 7, wherein, in response to the charging and discharging control circuit determining that the second signal source is a master device and the charging and discharging control circuit is a slave device, the charging and discharging control circuit determines that the mode of the second connection port is in the second charging mode, and wherein, in response to the charging and discharging control circuit determining that the second signal source is the slave device and the charging and discharging control circuit is the master device, the charging and discharging control circuit determines that the mode of the second connection port is in the second discharging mode.

9. The charging and discharging circuit according to claim 1, wherein the charging and discharging control circuit is configured to charge the battery module through the battery terminal in response to the first charging path or the second charging path being enabled.

10. The charging and discharging circuit of claim 1, wherein, in response to the first connection port being determined to be in the first discharging mode and the second connection port being determined to be in the second discharging mode, the charging and discharging control circuit is configured to control the second switch circuit and the fourth switch circuit, so as to simultaneously enable the first discharging path and the second discharging path.

11. The charging and discharging circuit according to claim 1, wherein the first switch circuit, the second switch circuit, the third switch circuit, and the fourth switch circuit each include a P-type metal-oxide-semiconductor field effect transistor (MOSFET) and an N-type MOSFET.

12. The charging and discharging circuit according to claim 11, wherein the first switch circuit, the second switch circuit, the third switch circuit, and the fourth switch circuit each further include a current limiting unit configured to turn off the corresponding P-type MOSFET and the corresponding N-type MOSFET in response to a rated current being exceeded.

* * * * *